United States Patent
Papadimitriou et al.

(10) Patent No.: US 7,313,168 B2
(45) Date of Patent: Dec. 25, 2007

(54) METHOD AND APPARATUS FOR RECEIVING A CDMA SIGNAL

(75) Inventors: Panayiotis D. Papadimitriou, Euless, TX (US); Prabodh Varshney, Coppell, TX (US); Mohammad Jaber Borran, Irving, TX (US)

(73) Assignee: Nokia Corporation, Espoo (FI)

( * ) Notice: Subject to any disclaimer, the term of this patent is extended or adjusted under 35 U.S.C. 154(b) by 598 days.

(21) Appl. No.: 10/395,831

(22) Filed: Mar. 24, 2003

(65) Prior Publication Data

US 2004/0190601 A1 Sep. 30, 2004

Related U.S. Application Data

(60) Provisional application No. 60/452,870, filed on Mar. 6, 2003.

(51) Int. Cl.
*H04B 1/69* (2006.01)
*H04B 1/713* (2006.01)

(52) U.S. Cl. .................. 375/148; 375/144; 375/340

(58) Field of Classification Search ............ 375/147, 375/148, 341, 342, 343, 144, 142, 150, 140, 375/149; 370/343, 470, 479, 497, 203, 209, 370/204, 320, 441; 455/67.3, 63
See application file for complete search history.

(56) References Cited

U.S. PATENT DOCUMENTS

| | | | |
|---|---|---|---|
| 5,644,592 A * | 7/1997 | Divsalar et al. ............ 375/147 |
| 6,014,373 A * | 1/2000 | Schilling et al. ............ 370/342 |
| 6,278,732 B1 | 8/2001 | Beidas et al. |
| 6,487,221 B1 * | 11/2002 | Bertrand et al. ............ 370/497 |
| 6,512,757 B1 * | 1/2003 | Niegel et al. ............... 370/342 |
| 6,519,477 B1 | 2/2003 | Baier et al. |
| 6,526,103 B1 * | 2/2003 | Li et al. ..................... 375/316 |
| 6,570,864 B1 * | 5/2003 | Kim et al. .................. 370/342 |
| 6,574,271 B2 * | 6/2003 | Mesecher et al. .......... 375/148 |
| 6,707,788 B1 * | 3/2004 | Kim et al. .................. 370/203 |
| 6,882,678 B2 * | 4/2005 | Kong et al. ................. 375/144 |
| 2001/0038665 A1 * | 11/2001 | Baltersee et al. ........... 375/148 |
| 2003/0095590 A1 * | 5/2003 | Fuller et al. ................ 375/148 |
| 2004/0090906 A1 * | 5/2004 | Moshavi et al. ............ 370/208 |

OTHER PUBLICATIONS

Cho, et.al. Jul. 2000 (IEEE). Performance of the Improved PIC Receiveer for DS_CDMA over.
Lin, et.al. Jun. 2002 (IEEE). A Novel Multiuser DetectionScheme Combining Adaptive MMSE Receiver.
Host-Madsen, et.al. Aug. 1999 (IEEE). MMSE/PIC Multiuser Detection for DS/CDMA Systems with.
Cruickshank., Aug. 1996 (IEEPC). Supression of Multiple Accesx Interference in a DS-CDMA System.

\* cited by examiner

*Primary Examiner*—Chieh M. Fan
*Assistant Examiner*—Qutub Ghulamali
(74) *Attorney, Agent, or Firm*—Alston & Bird LLP (57) ABSTRACT

A hybrid receiver, and an associated method, for receiving a radio signal carrying transmitted data that is subject to distortion in the transmission channel. The receiver includes a plurality of stages that perform parallel interference cancellation (PIC) to establish successively more accurate estimates of the transmitted data, including a receiver first stage being either a RAKE receiver or a linear minimum mean-square error (LMMSE) receiver, a second stage including an LMMSE, and preferably a third stage also including an LMMSE. Each stage processes the estimates of the transmitted signal provided by the stage preceding it to mitigate or eliminate as much transmission-channel interference as possible and prove a refined estimate for processing by subsequent stages. Improved channel estimation may be achieved by processing the pilot signal in similar fashion as well.

12 Claims, 6 Drawing Sheets

METHOD AND APPARATUS FOR RECEIVING A CDMA SIGNAL

This application claims the benefit of U.S. Provisional Application No. 60/452,870, filed Mar. 6, 2003.

FIELD OF THE INVENTION

The present invention relates generally to radio telephony, and more specifically to a method and apparatus for receiving and processing a radio signal that is subject to transmission-channel distortion.

BACKGROUND OF THE INVENTION

Radio telephones, commonly called cellular (or "cell") phones, have become ubiquitous in recent years. Formerly the domain of the wealthy, or those in specialized professions for whom the great expense then associated with them was justified, radio telephones are now used by a majority of the population in this country and in many other regions around the world. Considerable leaps in technology have contributed significantly to this evolution. These advances have not only made radio telephone service available to many subscribers at a reasonable price, but they have also permitted great increases in the capacity of the communication networks providing the service.

The cell phone is so called because it is designed to operate within a cellular network. Such a network has infrastructure that switches and routes calls to and from network subscribers who are using portable radio devices. Rather than having one or two antennas to handle all of this radio traffic, however, the cellular network is divided into a great many smaller areas, or "cells", each having an antenna of their own. A cellular wireless system has several advantages over a central antenna system. As the cells are much smaller than the large geographic area covered by a central antenna, transmitters do not need as much power. This is particularly important where the transmitter is housed in a small device such as a cell phone. In addition, the use of low-power transmitters means that although the number of them operating in any one cell is still limited, the cells are small enough that a great many may operate in an area the size of a major city. The mobile stations do not transmit with enough power to interfere with others operating in other cells, or at least those cells that are not adjoining. In some networks, this enables frequency reuse, that is, the same communication frequencies can be used in non-adjacent cells at the same time without interference. This permits the addition of a larger number of network subscribers. In other systems, codes used for privacy or signal processing may be reused in a similar manner.

At this point, it should also be noted that as the terms for radio telephones, such as "cellular (or cell) phone" and "mobile phone" are often used interchangeably, they will be treated as equivalent herein. Both, however, are a sub-group of a larger family of devices that also includes, for example, certain computers and personal digital assistants (PDAs) that are also capable of wireless radio communication in a radio network. This family of devices will for convenience be referred to as "mobile stations" (regardless of whether a particular device is actually moved about in normal operation).

In addition to the cellular architecture itself, certain multiple access schemes may also be employed to increase the number of mobile stations that may operate at the same time in a given area. In frequency-division multiple access (FDMA), the available transmission bandwidth is divided into a number of channels, each for use by a different caller (or for a different non-traffic use). A disadvantage of FDMA, however, is that each frequency channel used for traffic is captured for the duration of each call and cannot be used for others. Time-division multiple access (TDMA) improves upon the FDMA scheme by dividing each frequency channel into time slots. Any given call is assigned one or more of these time slots on which to send information. More than one voice caller may therefore use each frequency channel. Although the channel is not continuously dedicated to them, the resulting discontinuity is usually imperceptible to the user. For data transmissions, of course, the discontinuity is not normally a factor.

Code-division multiple access (CDMA) operates somewhat differently. Rather than divide the available transmission bandwidth into individual channels, individual transmissions are spread over a frequency band and encoded. By encoding each transmission in a different way, each receiver (i.e. mobile station) decodes only information intended for it and ignores other transmissions. The number of mobile stations that can operate in a given area is therefore limited by the number of encoding sequences available, rather than the number of frequency bands. The operation of a CDMA network is normally performed in accordance with a protocol referred to as IS-95 (interim standard-95) or, increasingly, according to its third generation (3G) successors, such as those sometimes referred to as 1×EV-DO and 1×EV-DV, the latter of which provides for the transport of both data and voice information.

Figure 1:
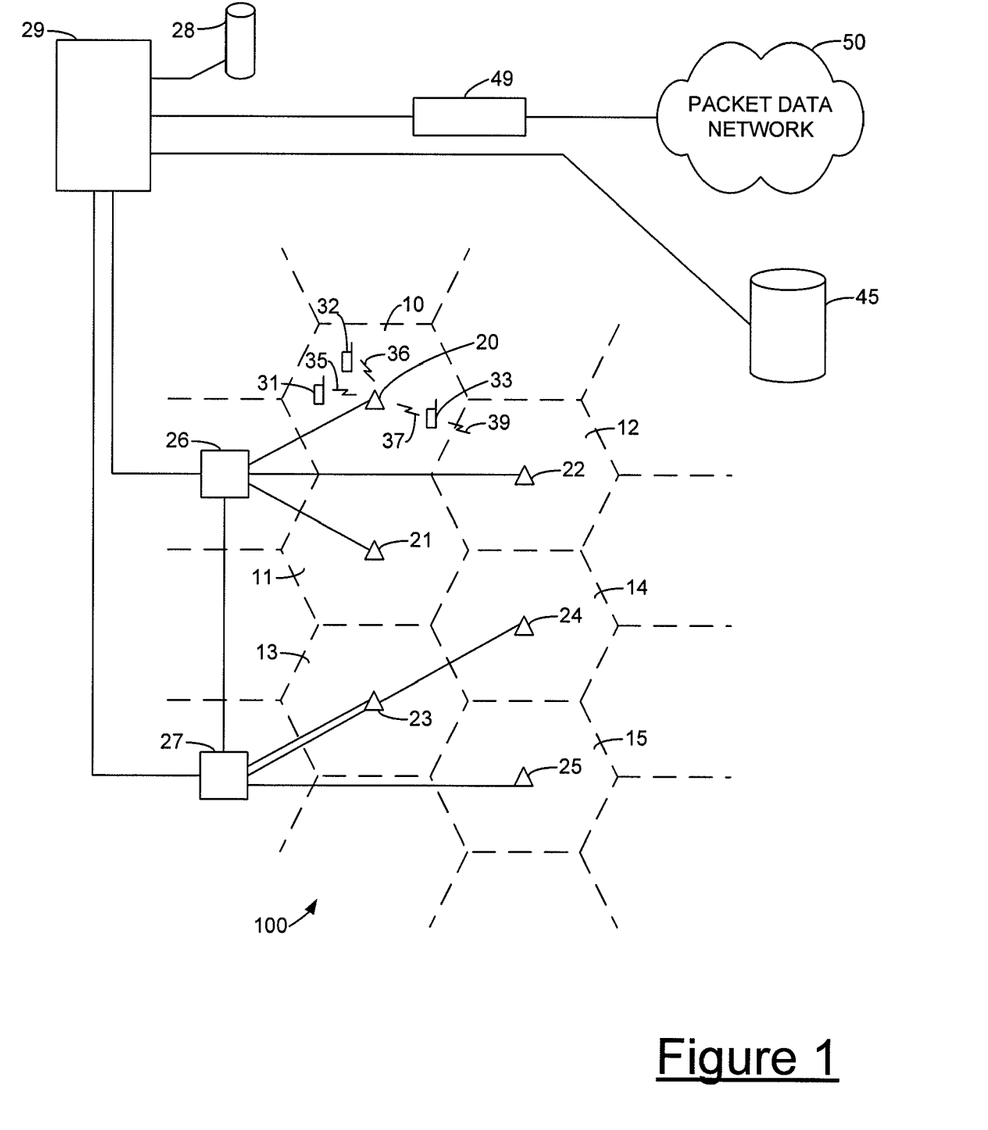
FIG. 1 is functional block diagram illustrating the relationship of selected components of a typical CDMA telecommunication network, such as one that might advantageously employ the hybrid receiver of the present invention.

FIG. 1 is a simplified block diagram illustrating the configuration of a typical cellular network 100 operable according to a CDMA standard. As mentioned previously, the entire geographic area covered by such a network (which is not shown in FIG. 1) is divided into a number of cells, such as cells 10 through 15 delineated by broken lines in FIG. 1. Although only six cells are shown, there are typically a great many. In the illustrated embodiment, each cell has associated with it a base transceiver station (BTS) for example BTS 20 for transmitting and receiving messages to and from mobile stations (MS) in cell 10, here MS 31, MS 32, and MS 33, via radio frequency (RF) links 35, 36, and 37, respectively. Mobile stations MS 31 through MS 33 are usually (though not necessarily) mobile, and free to move in and out of cell 10. Radio links 35-37 are therefore established only where necessary for communication. When the need for a particular radio link no longer exists, the associated radio channels are freed for use in other communications. (Certain channels, however, are dedicated for beacon 5 transmissions and are therefore in continuous use.) BTS 21 through BTS 25, located in cell 11 through cell 15, respectively, are similarly equipped to establish radio contact with mobile stations in the cells they cover.

BTS 20, BTS 21, and BTS 22 operate under the direction of a base station controller (BSC) 26, which also manages communication with the remainder of network 100. Similarly, BTS 23, BTS 24, and BTS 25 are controlled by BSC 27. In the network 100 of FIG. 1, BSC 26 and 27 are directly connected and may therefore both communicate and switch calls directly with each other. Not all BSCs in network 100 are so connected, however, and must therefore communicate through a central switch. To this end, BSC 20 is in communication with mobile switching center MSC 29. MSC 29 is operable to route communication traffic throughout network 100 by sending it to other BSCs with which it is in communication, or to another MSC (not shown) of network 100. Where appropriate, MSC 29 may also have the capability to route traffic to other networks, such as a packet data network 50.

Packet data network 50 may be the Internet, an intranet, a local area network (LAN), or any of numerous other communication networks that transfer data via a packet-switching protocol. Data passing from one network to another will typically though not necessarily pass through some type of gateway 49, which not only provides a connection, but converts the data from one format to another, as appropriate. Note that packet data network 50 is typically connected to the MSC 29, as shown here, for low data rate applications. Where higher data rates are needed, such as in 1×EV-DO or 1×EV-DV networks, the packet data network 50 is connected directly to the BSCs (26, 27), which in such networks are capable of processing the packet data.

Networks carrying both voice and data over radio links to a great many mobile stations, however, must use high bit rates produced through the use of high baud rates and high-order (for example 16-QAM) modulation schemes. Under these conditions the distortion from multipath and multi-user interference are exacerbated. Several techniques are currently being used to mitigate these types of interference. Even applying known corrective measures, however, the distortion may reach the level at which the system fails to meet its quality-of-service (QoS) requirements, especially in high-bit-rate applications. Needed therefore is a radio receiver that more accurately replicates a transmitted CDMA signal, even in the high bit rate environment required for 1×EV-DO and 1×EV-DV networks. The present invention provides just such a solution.

SUMMARY OF THE INVENTION

In one aspect, the present invention is an improved receiver for receiving and processing radio-frequency signals transmitted though a telecommunication network, including a parallel interference canceller (PIC) having a first stage for mitigating any transmission-channel interference present in the received signal, and having a second stage for receiving the processed results of the first stage and mitigating multi-user interference to produce a further-refined estimate of the transmitted signal, the second stage having a linear minimum mean-square error (LMMSE) chip equalizer. The receiver further includes third stage for receiving the results of the second-stage and further processing it in a similar fashion. Additional stages may also be present for further refining the estimate of the received signal. The first stage of the receiver may include an LMMSE or a RAKE receiver. In various embodiments of the present invention, the second and third (and any subsequent stages) may be coupled to receive, in addition to the output of the immediately preceding stage, the received signal as provided to the first stage. Stages receiving this additional input may utilize it to improve channel estimation.

In another aspect, the present invention is a method of processing a received CDMA signal including the steps of receiving a CDMA transmission, estimating the received signal in a first stage, providing the first stage output combined with the original signal to a second-stage parallel interference canceller (PIC), the second stage PIC including an LMMSE and providing a refined estimate of the received signal, providing the first stage output combined with the original signal to a second-stage parallel interference canceller (PIC), providing a refined estimate of the received signal as an output of the third stage and providing the output to a detector for detecting the original transmission based on the refined signal.

BRIEF DESCRIPTION OF THE DRAWINGS

For a more complete understanding of the present invention, and the advantages thereof, reference is made to the following drawings in the detailed description below.

DETAILED DESCRIPTION

FIGS. 1 through 8, discussed herein, and the various embodiments used to describe the present invention are by way of illustration only, and should not be construed to limit the scope of the invention. Those skilled in the art will understand the principles of the present invention may be implemented in any similar radio-communication device, in addition to those specifically discussed herein.

The present invention presents an innovative hybrid design for radio receivers, and in particular those employing parallel interference cancellation (PICs), such as those used in code division multiple access (CDMA) telecommunications systems, to more accurately reproduce a transmitted signal notwithstanding the presence of certain types of distortion. The transmission and reception of this signal is generally illustrated in the block diagram of FIG. 2. Encoded data bits, represented by the vector u, are modulated in modulator 205. The resulting signal d is then spread in spreader 210 across the transmission frequency spectrum. The pilot signal (1+j0) is added in adder 215, and the result is provided to multiplier 220 where it is multiplied with a pseudorandom noise (PN) code to create a multi-coded spread sequence represented by the vector x. Sampling circuit 225 upsamples the signal x at the rate of $N_s$ samples per chip and provided to transmit filter 230 and transmitted over channel 235.

Figure 2:
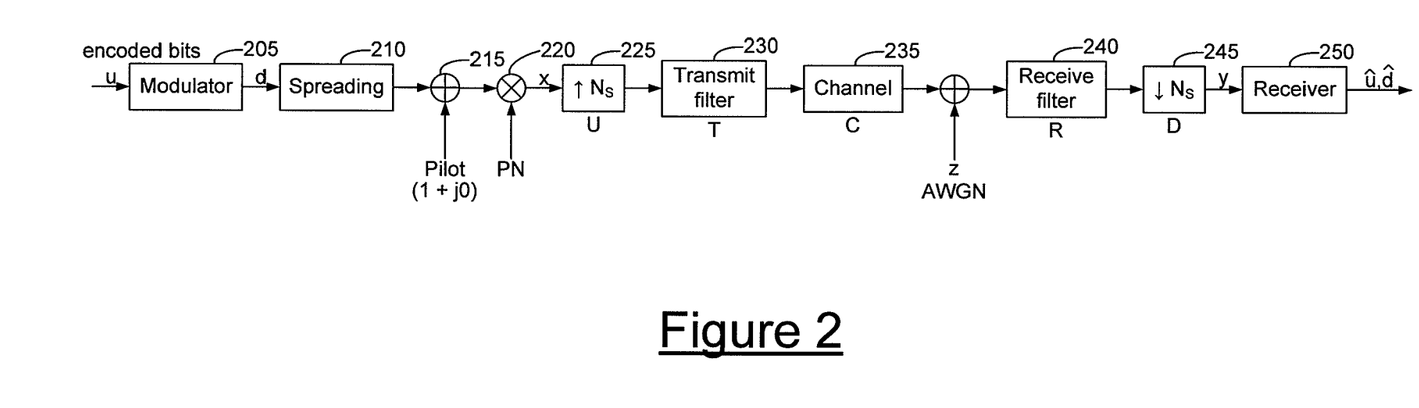
FIG. 2 is a functional block diagram illustrating an exemplary process of transmitting and receiving a communication signal in the network of FIG. 1.

The transmitted signal is received at receive filter 240. The received signal, including the additive white gaussian noise (AWGN) z attributable to the receiver, is then downsampled at sampling circuit 245, producing signal y as an output. If the effect of the transmit filter is represented as matrix T, the receive filter as R, and the channel as C, respectively, and the effect of the operations of upsampling and downsampling (at $N_s$ samples per chip) are represented as U and D, respectively, then the (downsampled and) received signal y may be represented as:

$$y = Hx + v \quad (1)$$

where H=DRCTU, and v=DRz.

As alluded to previously, CDMA networks are subject to various distortions that affect the quality and reliability of radio transmissions. One such distortion is referred to as "multipath interference". The area within network 100 (shown in FIG. 1) is not usually free from obstacles, but rather may be heavily populated with tall buildings, factories, and other structures (or environmental phenomena) that cause the radio signal to be reflected or diffracted, with the result that the same transmitted signal may divide into separate signals that take different paths from the transmitter to the receiver. These paths may vary in length, meaning that propagation time also varies, causing the same transmission to arrive at the receiver at several different times. To counter, and in fact to capitalize on the multipath phenomenon, CDMA devices commonly employ RAKE receivers.

Figure 3:
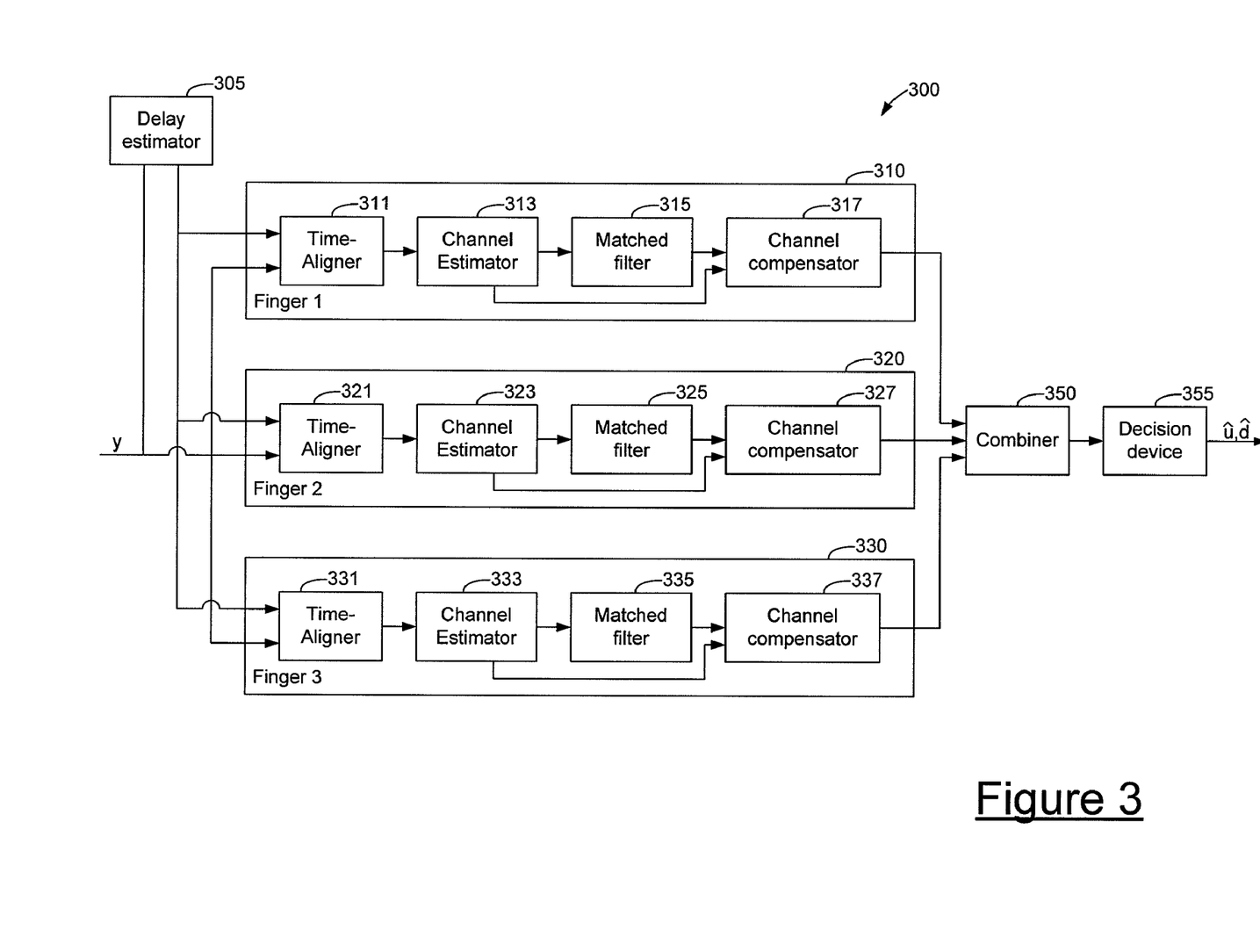
FIG. 3 is a functional block diagram illustrating selected components of a typical RAKE receiver, such as one that might be advantageously employed in the hybrid receiver of the present invention.

FIG. 3 is a simplified block diagram illustrating selected components of a typical RAKE receiver 300. The basic principle of the RAKE receiver involves selecting a limited number of individual versions of the transmitted signal, each subsequent version being a time-delayed carrier of the same transmitted signal as a first version. The time-delay between versions is a result of the many different paths taken by the signal traveling from the transmitter to the receiver. Each selected version is provided to a different RAKE "finger". The RAKE 300 of FIG. 3 has three fingers, 310, 320, 330, meaning that that it will process three received signals that contain the same transmitted information but are separated in time because they took different paths to the receiver. A delay estimator 305 is used to determine the different paths to be selected for analysis by each finger. Typically, the three (or however many) strongest versions will be selected, with the remaining ones simply ignored.

Each finger (310, 320, 330) of RAKE receiver 300 is provided with the received CDMA signal, and also with input from the delay estimator 305 containing multipath information. Time-aligner (311, 321, 331) aligns each signal in time, compensating for multipath delay. Each finger includes a matched filter (315, 325, 335) for applying the user's spreading code or signature sequence to despread their received signal, and a channel estimator (313, 323, 333) for creating channel information based on a known pilot signal. The channel information can then be used to remove channel effects in the channel compensator (317, 327, 337).

Each finger of a RAKE receiver therefore attempts to extract from one path the transmitted signal d for a given user or users. Having already been aligned in time, the recovered signals from each finger are provided to a combiner 350 where they are combined into one output signal exhibiting the diversity gain mentioned above, and then to a decision device 355.

Figure 4:
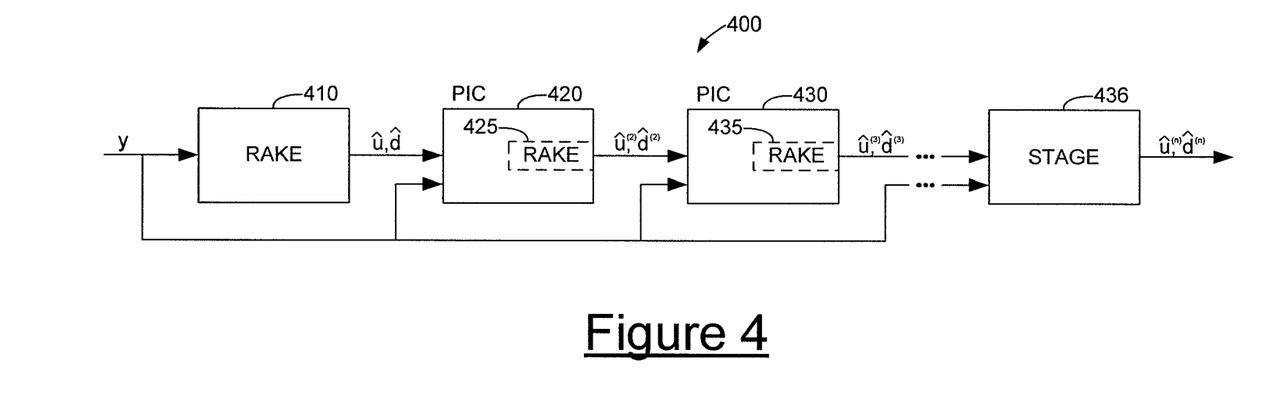
FIG. 4 is a functional block diagram illustrating selected components of a typical parallel interference canceller (PIC), such as one that might be advantageously modified to exploit the hybrid receiver of the present invention.

In addition to multipath distortion, CDMA receivers must also mitigate the effects of multi-user (or multiple access) interference introduced when a significant number of users use the same spread-spectrum frequency channel for transmission. This interference is often addressed through the use of a technique referred to as parallel interference cancellation (PIC—the circuit performing this technique is sometimes also referred to as "a PIC"). A typical PIC includes for each user a number of stages, for example three, with each stage including a RAKE receiver similar to the RAKE receiver 300 illustrated in FIG. 3. FIG. 4 is a functional block diagram illustrating selected components of an exemplary receiver 400 implementing PIC.

Referring to FIG. 4, the receiver 400 includes a RAKE receiver as a first-stage 410 that processes incoming signal y as described above, and outputs estimated encoded bits û and/or symbols d̂. Estimated data û, d̂ is provided to second stage 420. The second stage 420 of receiver 400 is a first PIC, which then operates to refine the estimate as follows. Setting j=1, then $\hat{x}_{k \neq i}$, is used to represent the reconstructed chip signal of a whole transmitted frame, based on decisions of the previous stage, of all the active spreading codes of the system (including the pilot)—except the $j^{th}$ spreading code. The multiuser interference "seen" by the $j^{th}$ spreading code is H $\hat{x}_{k \neq i}$, where H is defined over the entire frame. The PIC of second stage 420 then subtracts this interference from the received chip vector y to produce (ideally) an interference-free signal for the $j^{th}$ spreading code. This signal, which may be represented as y–H $\hat{x}_{k \neq i}$, is then passed through a RAKE receiver 425 incorporated as part of second stage 420 to yield the symbol estimates for the $j^{th}$ code for the next stage. Naturally, the process described above is repeated with respect to each j=2, 3, . . . K, where K is the number of active spreading codes (a user may have an assigned one, or multiple codes). The symbol estimates and the bit estimates of all users are denoted $\hat{d}^{(2)}$, $\hat{u}^{(2)}$, respectively and are passed to the third stage 430 of receiver 400.

Third stage 430 is also a PIC incorporating a RAKE receiver 435, and performs an operation similar to that described above with reference to the (first PIC of) second stage 420, but using its input $\hat{d}^{(2)}$, $\hat{u}^{(2)}$, to produce a further refined data estimate $\hat{d}^{(3)}$, $\hat{d}^{(3)}$. Bit or symbol estimates $\hat{d}^{(3)}$, $\hat{u}^{(3)}$, may be provided to a decoder (not shown), or may by subjected to further refinement in one or more additional PIC stages. FIG. 4 illustrates an additional stage 436 and FIGS. 5, 6 and 7 similarly illustrate stages 536, 637 and 737, respectively.

Another approach for mitigating interference effects from a received signal y employs a linear minimum mean-square error (LMMSE) receiver in place of one or both RAKE receivers 425 or 435 (see FIG. 4). As used herein, an LMMSE receiver is an LMMSE chip equalizer filter followed by a bank of matched filters, which in turn is followed by a decision device. An LMMSE chip equalizer filter seeks to minimize the mean-squared error between its output and the transmitted chip sequence, referred to here as $x_n$, with n being the chip time index. Rewriting equation (1) in block format, with y'=$[y_{n+F}, y_{n+F-1}, \ldots, y_n]^T$, F+1 being the filter taps, then H' is a Sylvester matrix of size (F+1)×(F+1+L), given by:

$$H' = \begin{pmatrix} h_0 & h_1 & \cdots & h_L & 0 & \cdots & 0 \\ 0 & h_0 & h_1 & \cdots & h_L & \ddots & \vdots \\ \vdots & \ddots & \ddots & & & \ddots & 0 \\ 0 & \cdots & 0 & h_0 & h_1 & \cdots & h_L \end{pmatrix} \quad (2)$$

where $(h_0, h_1, \ldots, h_L)^T$ is a truncated (L+1)—impulse response vector (of the overall response vector and containing most of its energy). Then, if $x'=(x_{n+F}, x_{n+F-1}, \ldots, x_n, \ldots, x_{n-L})^T$ and $v'=(v_{n+F}, v_{n+F}, \ldots, v_n)^T$:

$$y'=H'x'+v' \quad (3)$$

Therefore the LMMSE chip equalizer w* is given by:

$$w^* = \arg\min_w E\{\|w^H y' - x_n\|^2\} = \left(HH^H + \frac{1}{\sigma_x^2} R_{vv}\right)^{-1} \bar{h}_F \quad (4)$$

where $\bar{h}_F$ is the $F^{th}$ column of H', counting from 0, and assuming that the transmitted signal is independent of the additive noise, and that $R_{xx}=\sigma_x^2 I$. (Generally speaking, $\bar{h}_F$ may be any column of H', the selection made according to which yields the best performance in a given application.) Note that the LMMSE chip equalizer (filter) described in equation (4) is intended to be exemplary and not limiting, and other approaches are compatible with the practice of the present invention, described below, as well.

Figure 5:
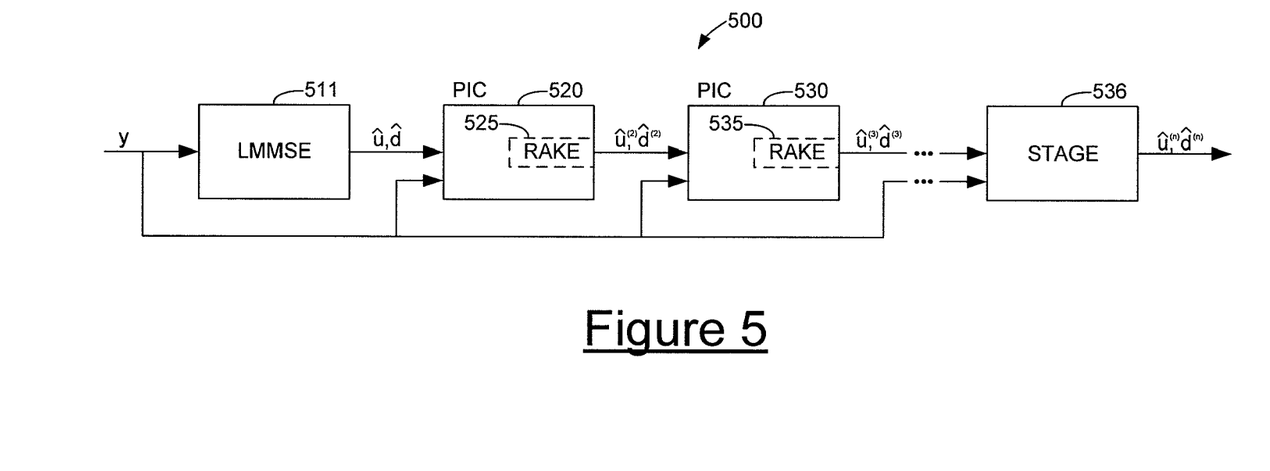
FIG. 5 is a functional block diagram illustrating selected components of a hybrid radio receiver, such as one that might be advantageously modified to exploit the hybrid receiver of the present invention.

An alternative design, FIG. 5 is a functional block diagram illustrating selected components of a receiver 500 in which an LMMSE receiver has been implemented in the first stage 511 in place of the RAKE receiver 410 illustrated in FIG. 4. The second stage 520 and third stage 530, in this embodiment, are substantially the same as the second stage 420 and third stage 430 of the receiver illustrated in FIG. 4.

At this point it is noted that in illustrating the receivers of FIGS. 4-7, analogous though not identical reference numbers are used for analogous components. Note also, however, that although each stage's inputs and outputs are for simplicity designated identically, in the various embodiments shown they may (and likely will) have different values even when provided with the same original input y. Finally, note that in each figure three-stage parallel interference cancellation is shown, although there could be any number of stages, with at least two stages being necessary to practice of the present invention, and at least three being preferred.

Figure 6:
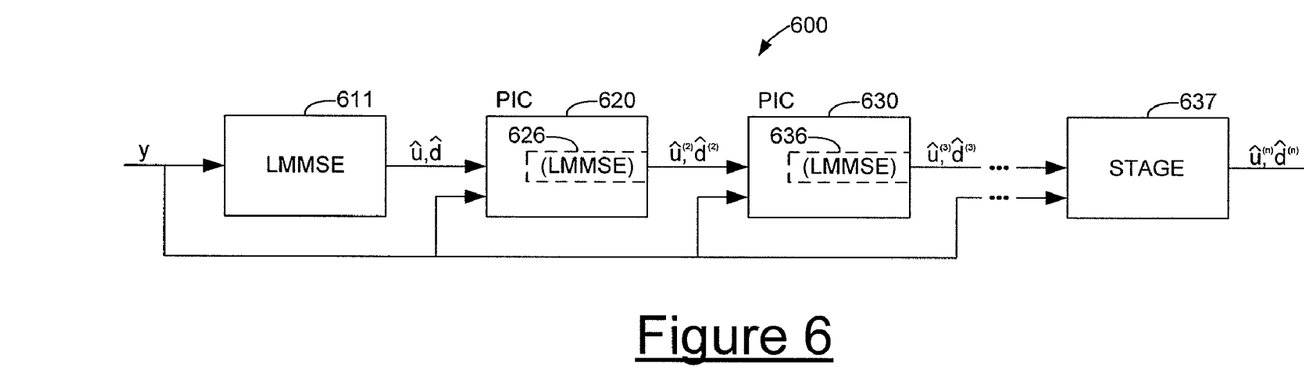
FIG. 6 is a functional block diagram illustrating selected components of a hybrid radio receiver in accordance with another embodiment of the present invention station.

FIG. 6 is a functional block diagram illustrating selected components of a receiver 600, which in this embodiment of the present invention also implements an LMMSE receiver in the first stage 611. In the second stage 620, however, an LMMSE receiver 626 processes the output of the PIC of second stage 620 in order to produce output $\hat{u}^{(2)}$, $\hat{d}^{(2)}$. In the embodiment of FIG. 6, the third stage 630, producing output $\hat{u}^{(3)}$, $\hat{d}^{(3)}$, likewise incorporates an LMMSE receiver 636 (although it is not necessary that the second and third stages be identically constructed or that the number of stages be limited to three).

Figure 7:
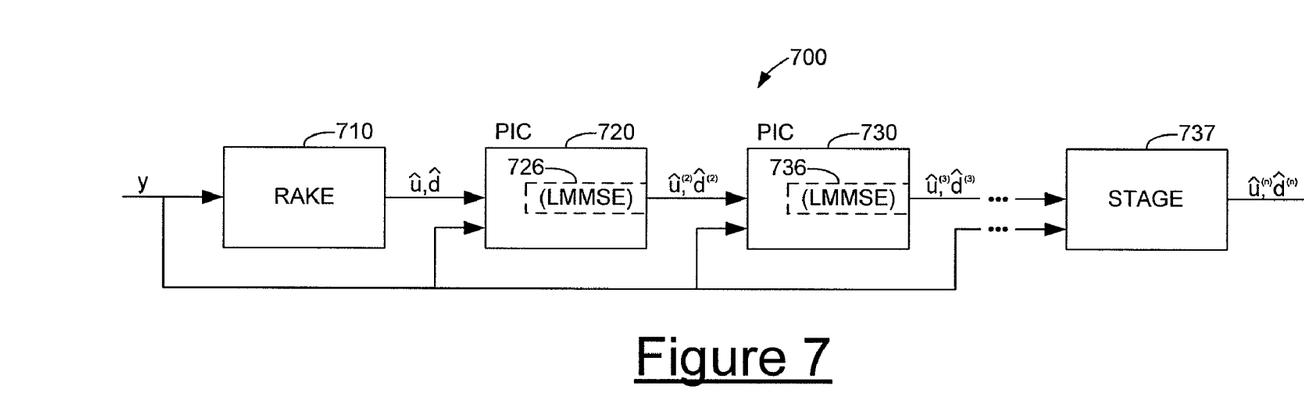
FIG. 7 is a functional block diagram illustrating selected components of a hybrid radio receiver in accordance with another embodiment of the present invention.

FIG. 7 is a functional block diagram illustrating selected components of a receiver 700 according to yet another embodiment of the present invention. In this embodiment, second stage 720 and third stage 730 include LMMSE 726 and LMMSE 736 for yielding their respective outputs $\hat{u}^{(2)}$, $\hat{d}^{(2)}$, and $\hat{u}^{(3)}$, $\hat{d}^{(3)}$. Unlike the embodiment of FIG. 6, however, this embodiment implements a RAKE receiver in its first stage 710.

In a particularly advantageous embodiment of the present invention, stages that include a PIC receiver can apply parallel interference cancellation to the pilot channel (or channels) in an analogous fashion to that used for user symbols. This alternative may significantly improve channel estimation.

Figure 8:
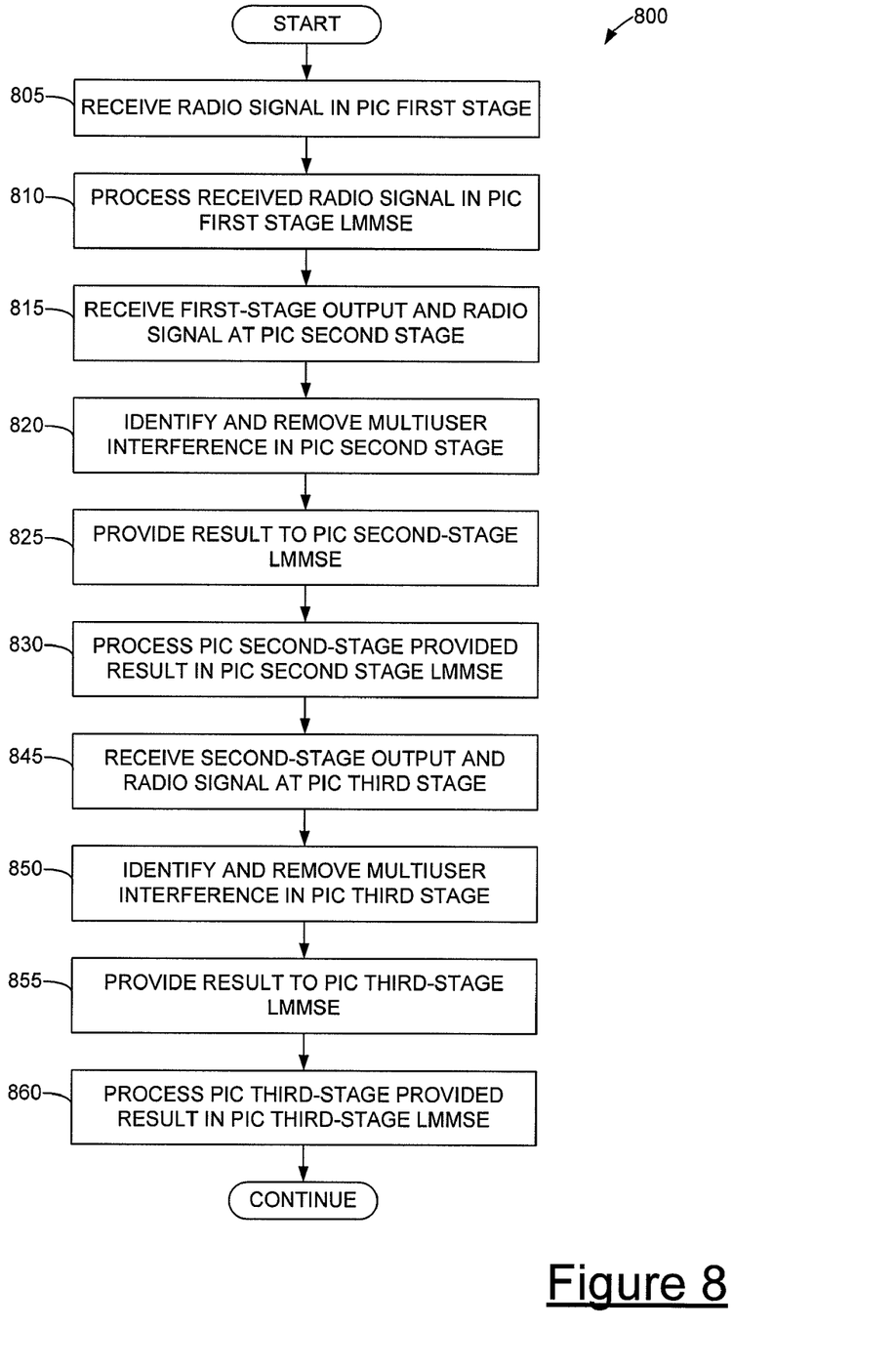
FIG. 8 is a flow chart illustrating a method of receiving and processing a radio signal according to an embodiment of the present invention.

FIG. 8 is a flow chart illustrating a method 800 of receiving a radio signal according to an embodiment of the present invention. Initially, (START), it is presumed that the receiver of FIG. 6 is being utilized; the operation of various other embodiments of the present invention should be apparent, however, in light of this disclosure and the accompanying drawings. The method begins when a radio signal is received at a receive filter (not shown in FIG. 6) of the receiver and then downsampled (steps not shown), resulting in a signal represented by a vector y. The downsampled signal y is then received at a first stage of the receiver (step 805), where it is filtered using an LMMSE chip equalizer (filter) in an attempt to minimize the mean-squared error between the transmitted chip signal and the received LMMSE filtered signal (step 810). Alternately, a RAKE receiver (see FIG. 7) may be used in the first stage to mitigate the effects of multipath signal distortion (step not shown). The output $\hat{u}$, $\hat{d}$ (see FIG. 6) of the first stage is then received at the PIC second stage along with the downsampled signal y (step 815).

In the PIC second stage, multiuser interference is identified and subtracted from the signal (step 820), and the result provided to an LMMSE receiver incorporated within the PIC second stage (step 825) and processed to produce output $\hat{u}^{(2)}$, $\hat{d}^{(2)}$ (step 830). This is then received at the PIC third stage, which is provided with the downsampled signal y as well (step 845). There, as in the PIC second stage, multiuser interference is identified and subtracted from the signal (step 850), and the result provided to an LMMSE incorporated within the PIC third stage (step 855). The third-stage LMMSE then processes the signal to produce output $\hat{u}^{(3)}$, $\hat{d}^{(3)}$ (step 860). This output is then provided to a decoder or, if present, a subsequent PIC stage or stages (step not shown). Operation of the LMMSE, PIC, and hybrid receiver of the present invention are further described in a (heretofore unpublished) paper entitled "Linear MMSE Chip Equalization and Parallel Interference Cancellation as Applied to 1×EV-DV", which is included as an Appendix to the foregoing disclosure and is incorporated herein by reference.

The preferred descriptions are of preferred examples for implementing the invention, and the scope of the invention should not necessarily be limited by this description. Rather, the scope of the present invention is defined by the following claims.

What is claimed is:

1. In a radio receiver for use in a radio communication network, an improvement of a receiver for receiving a transmitted radio signal, the signal being subject to distortion, said receiver comprising:
   a first stage for receiving indications of the radio transmission and processing the indications in order to at least partially mitigate the distortion, and producing an estimation of the transmitted radio signal as an output;
   a second stage for receiving the output of the first stage and processing the output of the first stage to further refine the estimation; and
   a third stage for receiving the output of the second stage and processing the output of the second stage to further refine the estimation; and
   at least one additional stage that is subsequent to the third stage for receiving the output of the stage preceding the at least one additional stage and processing the received output further to refine the estimation,
   wherein the second stage and the third stage form a parallel interference canceller (PIC), and wherein at least one stage that is subsequent to the first stage comprises a linear minimum mean-square error (LMMSE) receiver.

2. The receiver of claim 1, wherein the receiver is operable according to a code division multiple access (CDMA) standard.

3. The receiver of claim 1, wherein the first stage comprises a RAKE receiver.

4. The receiver of claim 1, wherein the first stage comprises an LMMSE receiver.

5. The receiver of claim 1, wherein the receiver also receives a pilot signal, and wherein the second stage also produces a refined estimation of the pilot signal.

6. The receiver of claim 5, wherein a plurality of stages that are subsequent to the first stage also each receive a pilot signal and produce a further refined estimation of the pilot signal.

7. A method for processing a received radio signal, the radio signal carrying transmitted data and susceptible to distortion, said method comprising the steps of:

receiving indications of the received radio signal in a first stage of the receiver;

processing the signal in order to at least partially remove at least some of the distortion to produce as output an estimate of the transmitted data;

receiving as input in a second stage of the receiver the output of the first stage;

processing the input received in the second stage to mitigate signal distortion, if any, and providing the results as output;

receiving as input in a third stage of the receiver the output of the second stage;

processing the input received in the third stage to mitigate signal distortion, if any, and providing the results as output; and for at least one additional stage that is subsequent to the third stage, receiving as input in the at least one additional stage the output of the stage preceding the at least one additional stage and processing the received output further to refine the estimation, wherein the second and third stages perform parallel interference cancellation; and wherein at least one stage that is subsequent to the first stage comprises a linear minimum mean-square error (LMMSE) receiver for processing the results of the at least one stage before the results are provided as output.

8. The method of claim 7, wherein the receiver is operable according to a code division multiple access (CDMA) standard.

9. The method of claim 7, wherein the first stage comprises a RAKE receiver.

10. The method of claim 7, wherein the first stage comprises an LMMSE receiver.

11. The method of claim 7, wherein the transmitted radio signal includes a pilot signal, and further comprising the step of producing an estimate of the pilot signal.

12. The method of claim 7, wherein the pilot signal is provided to a plurality of stages for producing a further refined pilot signal estimate.

* * * * *